June 29, 1971   J. DEVLIN ET AL   3,588,947
HIDE PULLER
Filed April 22, 1969   4 Sheets-Sheet 1

INVENTORS
JOHN DEVLIN
G. ALFRED GIESSMANN
WILLIAM D GOSSET
BY
ATTORNEY

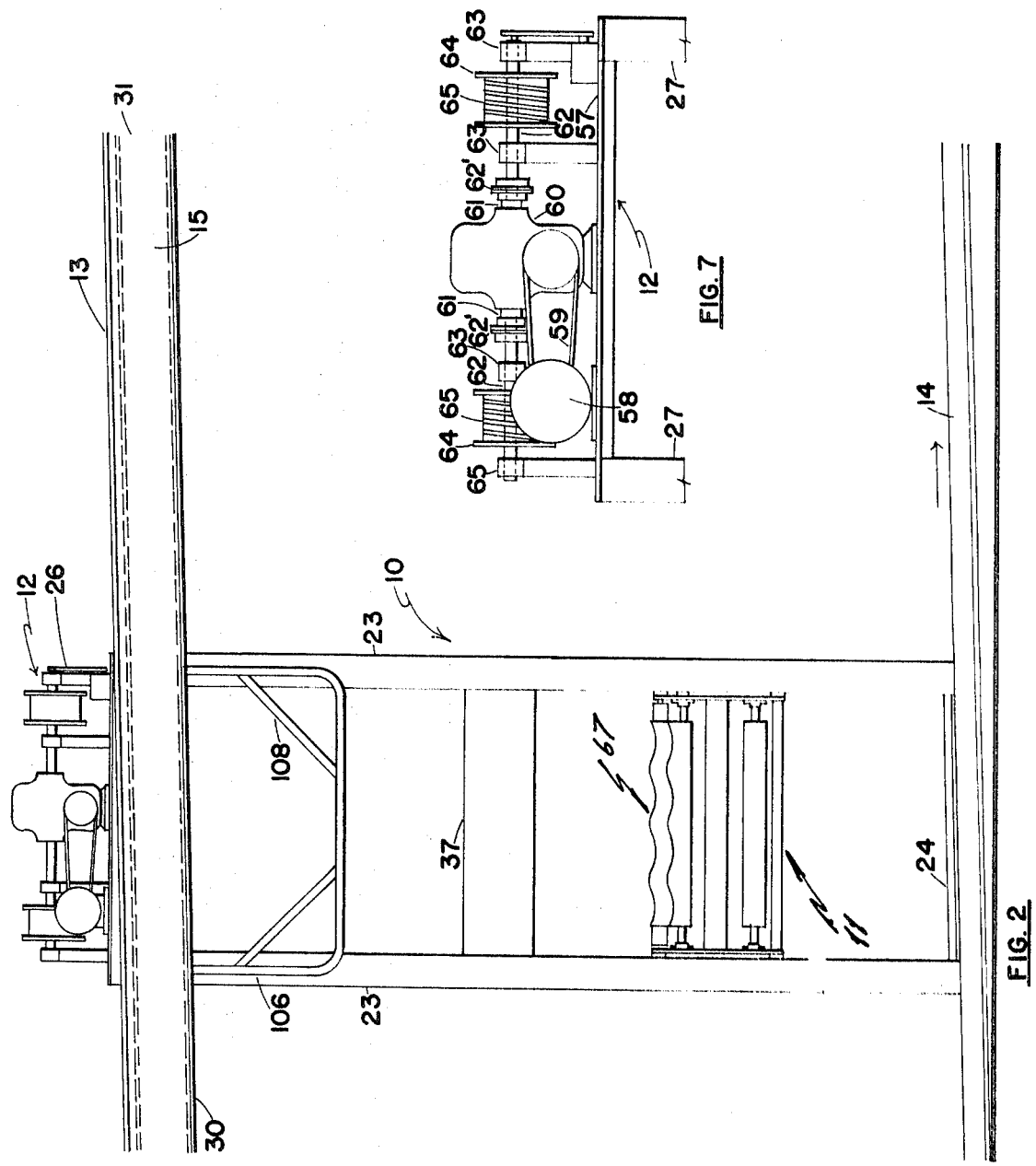

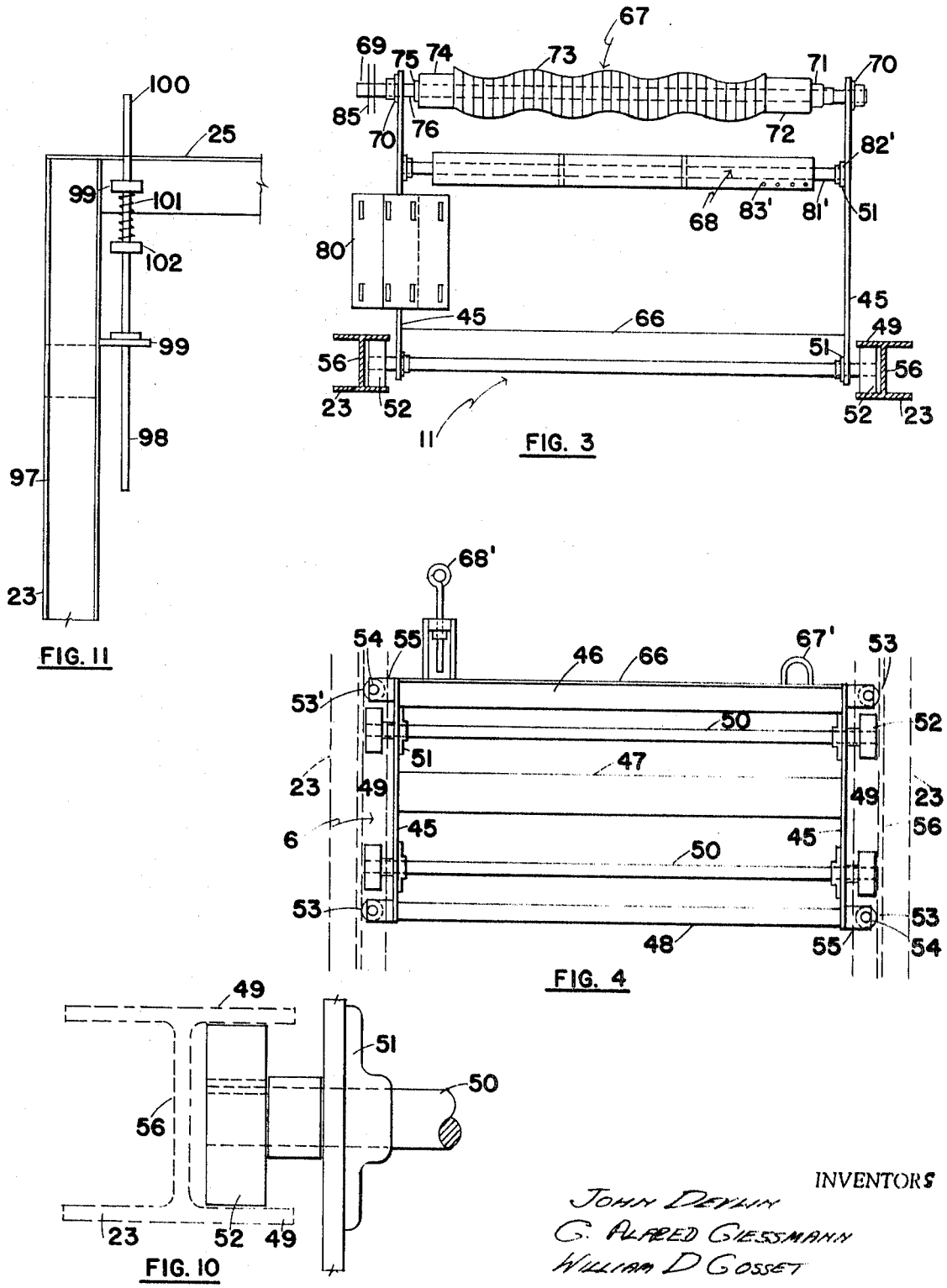

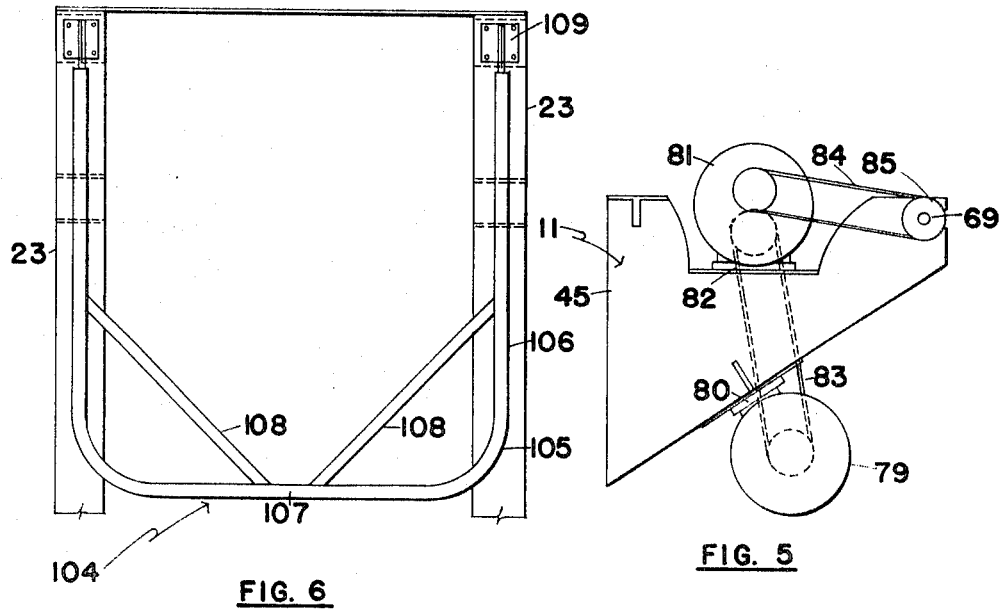
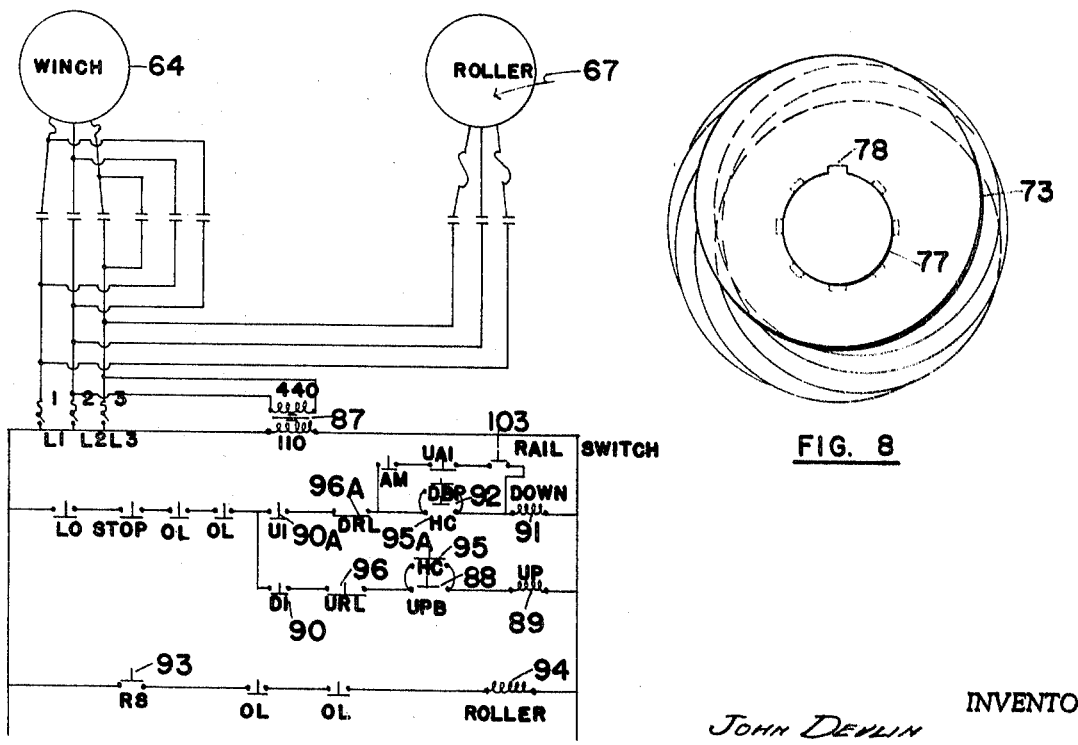

United States Patent Office 3,588,947
Patented June 29, 1971

3,588,947
HIDE PULLER
John Devlin and G. Alfred Giessmann, Lethbridge, Alberta, and William D. Gosset, Toronto, Ontario, Canada, assignors to Canada Packers Limited, Toronto, Ontario, Canada
Filed Apr. 22, 1969, Ser. No. 818,360
Int. Cl. A22b 15/16
U.S. Cl. 17—21                                     21 Claims

ABSTRACT OF THE DISCLOSURE

A hide puller for beef hide stripping on the rail which consists of a roll assembly reciprocating vertically in a carriage with a driven eccentric roller in the roll carriage engaging between the hide and the back of the carcass thus stripping the hide from the carcass as the roll assembly moves upwardly.

---

This invention relates to new and useful improvements in hide puller assemblies, particularly hide puller assemblies adapted for use in the continuous rail dressing of carcasses.

The advent of continuous rail dressing eliminated the necessity of manually removing the hides from the carcass while lying on pritch plates inasmuch as this particular operation is now carried out on the rail.

Conventionally a hide puller such as that shown and described in U.S. Pat. No. 2,696,633 is used for the hide removal but this suffers from excessively high maintenance costs and does not completely remove the hide.

Alternatively a hide winch or stripper is utilized but this is unsanitary and contributes to manure contamination. Furthermore it produces inferior dressing which lowers the quality of the carcass as well as spoiling the grade of the hides.

The present invention overcomes these disadvantages by providing a hide puller which operates on different principles from the pullers hereinbefore described.

It is, of course, to be understood that the carcass is treated prior to engagement with the hide puller so that the head is removed and the carcass has been opened up from the brisket to the flank in the usual manner and the hide rimmed back along each side of the cut as is conventional.

From this point on the novel hide puller may operate to remove the hide entirely with the minimum damage occurring to the flesh of the carcass and with the minimum damage occurring to the hide itself. Furthermore, manure contamination is practically eliminated due to the fact that the roll assembly of the present device always engages between the hide and the carcass until the hide is completely removed whereupon it drops to a hide chute clear of the carcass.

Another object of the invention is to provide a device of the character herewithin described in which a relatively constant tension is maintained upon the hide by a winch thus pulling it away from the carcass at an angle and enabling the roll assembly to separate the hide from the carcass as the roll assembly moves upwardly. Furthermore, the weight of the carcass although normally maintaining the carcass vertically, nevertheless does allow a slight movement of the carcass to and from the hide puller or stripper thus enabling the roll assembly, in effect, to follow the contour of the shoulder area, the back area, and the rump area.

A yet further object of the invention is to provide a device of the character herewithin described in which the hide puller is adapted to move parallel with the rail, being pulled along by the movement of the carcass along the rail during the stripping operation and which may then return to the original starting point by gravity ready for engagement with the next succeeding carcass moving along the rail.

In summary, the invention consists of a rail mounted frame or carriage which is free to travel parallel to the overhead conveyor behind the carcass. It is propelled by being attached to the neck portion of the hide and returns, when freed, by gravity along a sloping rail to its original position.

A movable roll assembly moves vertically on the rail mounted frame actuated by a hoisting mechanism; the roll is driven in a direction to roll the hide away from the animal when the roll assembly is raised by the hoisting mechanism. On the lower side of the rail mounting frame is a device for clamping and tensioning the hide over the roller.

With the foregoing in view, and such other or further purposes, advantages or novel features as may become apparent from consideration of this disclosure and specification, the present invention consists of, and is hereby claimed to reside in, the inventive concept which is comprised, embodies, embraced, or included in the method, process, construction, composition, arrangement or combination of parts, or new use of any of the foregoing, of which concept, one or more specific embodiments of same are herein exemplified as illustrative only of such concept, reference being had to the accompanying figures in which:

FIG. 2 is a front elevation of FIG. 1 but reduced in scale and with the carcass removed for clarity.

FIG. 3 is a plan view of the roll assembly per se substantially along the line 3—3 of FIG. 1.

FIG. 4 is a rear elevation of FIG. 3 substantially along the line 4—4 of FIG. 1 but with the eccentric roller removed for clarity.

FIG. 5 is an enlarged side elevation of the roll assembly per se.

FIG. 6 is a front elevation of the rump bar per se.

FIG. 7 is a front elevation of the winch assembly at the upper end of the frame.

FIG. 8 is an enlarged end view of the eccentric roller per se.

FIG. 10 is an enlarged fragmentary view of one of the rollers of the roll assembly.

FIG. 11 is an enlarged fragmentary view of an emergency limit switch operator.

FIG. 12 is a schematic view of the electrical control circuit.

In the drawings like characters of reference indicate corresponding parts in the different figures.

Figures 1, 9:
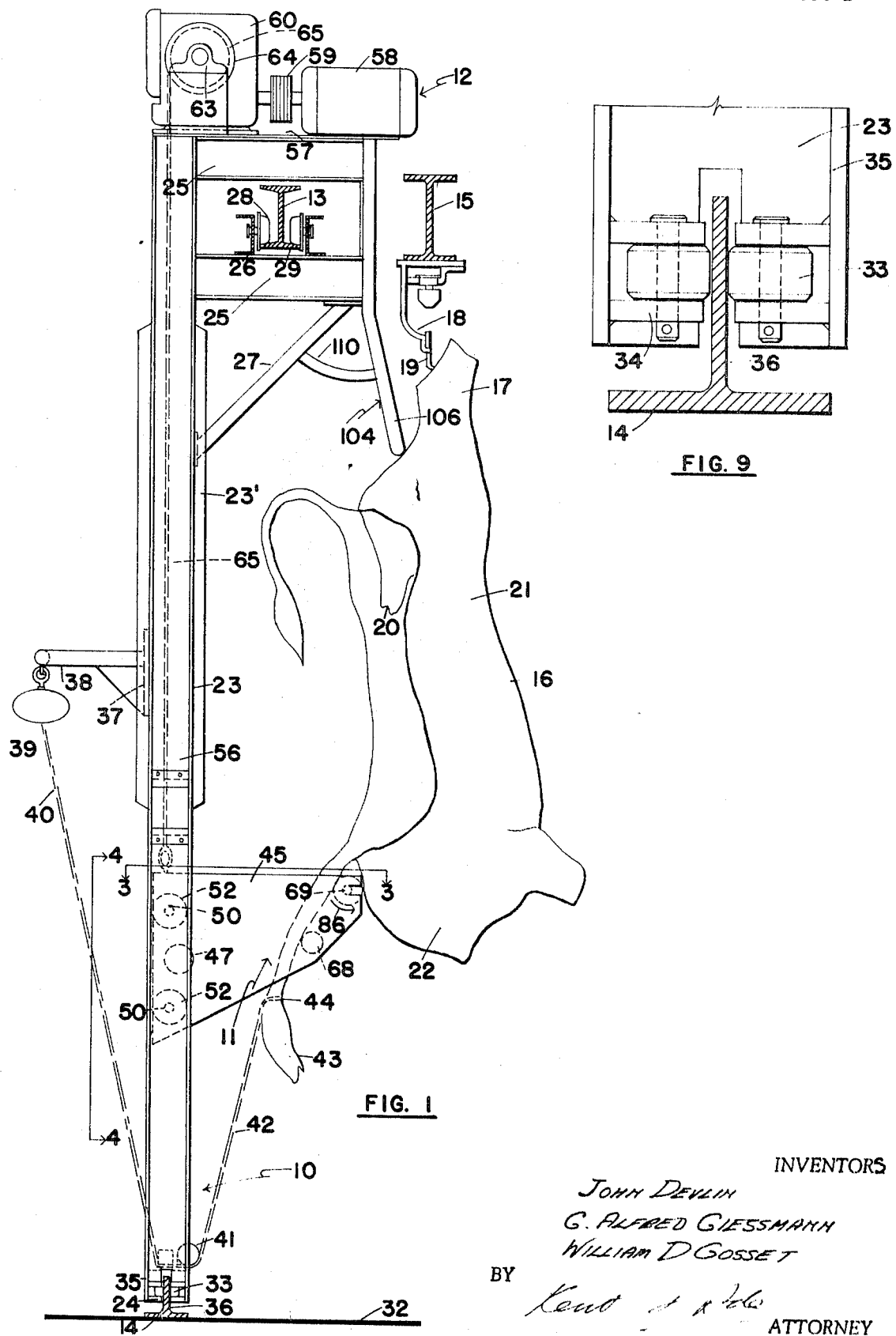
FIG. 1 is a side elevation of the device showing a carcass in position for hide stripping or removal.
FIG. 9 is an enlarged fragmentary end view of the lower roller support.

The invention generally consists of a carriage assembly collectively designated 10 within which is mounted for vertical reciprocation a roll assembly collectively designated 11 operated by a winch assembly collectively designated 12, all of which is mounted upon hide puller rails 13 and 14 for movement parallel to a conventional dressing rail 15 upon which a carcass 16 is suspended by the hind legs 17 to conventional roller shackle assemblies 18.

The shackle assemblies are moved along the dressing rail 15 in a conventional manner (not illustrated).

Dealing first with the carcass 16, the head and hocks are removed and the shackle hooks 19 engage through the rear legs in the usual manner. The carcass is opened up and the hide 20 is rimmed back over the flanks 21 and also skinned back over the legs and neck area 22 so that it takes up the position shown in FIG. 1.

The puller carriage 10 includes a pair of spaced and parallel H cross sectional beams 23 maintained in spaced and parallel vertical relationship by means of cross members 24 situated at convenient locations adjacent the upper and lower ends thereof.

A winch frame structure 25 extends outwardly from the upper ends of the H beams 23 and channel members 26 extend between the lowermost of these members as shown in FIG. 1. Diagonal braces 27 support the winch frame structure and extend between the members 25 and the H beams 23.

Ball bearing trolley wheels 28 journalled within the channel members 26 and engage the lower flanges 29 of the upper most hide puller rail 13 as shown in FIG. 1. This hide puller rail runs parallel to the dressing rail 15 but slopes upwardly from the intake end 30 to the other end 31.

It will therefore be appreciated that if the assembly rolls along this hide puller rail from the end 30 to the end 31, it will return to the end 30 by gravity when released as will hereinafter be described.

A lower hide puller rail 14 is secured to the floor 32 and slopes in a manner similar to rail 13, being spaced immediately therebelow.

Guide wheels 33 (see FIG. 9) are mounted horizontally between flanges 34 which in turn extend inwardly from the flanges 35 of the H beams 23 and engage the upstanding flange 36 of the lowermost hide puller rail 14 as shown in FIG. 9. This steadies the base of the supporting frame and prevents it from moving inwardly or outwardly with reference to the lower rail 14, during operation.

A cross member 37 spans the H beams 23 intermediate the ends thereof and supports an offstanding bracket assembly 38 which in turn supports a hoist assembly 39 electrically operated in the usual manner. As this hoist is a conventional unit, details are not shown with the exception that a chain or cable 40 extends from this hoist, downwardly and over a hide chain or cable guide 41 situated adjacent the lower ends of the H beams 23 and between these H beams. The guide is cylindrical in configuration and changes the direction of the chain or cable 40 as clearly shown. The end 42 of this chain or cable may be attached by a shackle (not illustrated) around the neck portion 43 of the hide as illustrated at 44 thus maintaining a tension on the hide as it is removed from the carcass, it being noted that the portion 42 of the chain inclines downwardly and inwardly towards the lower end or base of the hide puller (see FIG. 1).

The hide engages over the roll assembly 11 details of which are shown in FIGS. 3, 4 and 5.

Supporting structure takes the form of a pair of substantially triangular side plates 45 maintained in spaced apart relationship by an angle iron structure 46, by a main pipe spacer 47 and by a subsidiary type spacer 48.

The roll assembly is mounted for reciprocation between inner flanges 49 of the H beams 23 and details of this mounting is shown in FIGS. 3, 4 and 10.

A pair of shafts 50 extend between the side plates 45 and are supported within flange bearings 51 secured to the side plates.

Upon the ends of these shafts which extend beyond the side plates, are secured traction wheels or rollers 52, the diameter of which is equal to the distance between the flange 49 of the H beams as clearly shown.

It will therefore be appreciated that the roll assembly is supported by four rollers or wheels, one set above the other as clearly shown in FIG. 1.

Guide rollers 53 are journalled upon spindles 54 mounted in extensions 55 upon the side plates 45 and these guide rollers are situated just above and below the wheels 52. They are journalled for rotation at right angles to wheels 52 and engage the webs 56 of the H beams 23 thus preventing sideways movement of the roll assembly 11 as it moves upwardly and downwardly within the H beams 23.

The hoist assembly 12 is mounted upon a base plate 57 supported by the uppermost members 27 of the hoist frame and consists of on electric motor 58 connected to a source of electrical energy, said electric motor being connected via belts 59 to a worm gear reducer 60 having drive shaft 61 extending from each side thereof.

Chain couplers 62' connect the drive shaft 61 to the winch shaft 62 which in turn is supported within bearings 63 mounted upon the base plate. Winch drums 64 are secured to shaft 62 and are rotated thereby, and the winch drums have winch cables 65 engaging therearound.

It will be seen from FIG. 7 that there is a winch drum 64 upon each side of the reducer 60 and these drums are situated so that the winch cables 65 extend downwardly between the H beams and can be secured to the upper side 66 of the roll assembly (see FIG. 4).

One winch cable is secured by means of a shackle (not illustrated) to a U-bolt 67' and the other winch cable is secured by a shackle (not illustrated) to an I-bolt assembly 68' upon the opposite side of the roll assembly. This I-bolt is adjustable in length within limits thus enabling the cables to be adjusted in length so that the carriage is moved upwardly and downwardly and kept level during this operation.

Mounted intermediate the side plates 45 is an eccentric roller component collectively designated 67 and an idler roller component collectively designated 68. The eccentric roller component 67 consists of a shaft 69 journalled for rotation within bearings 70 secured to the side plates and having a flange 71 adjacent one end thereof.

A spacer 72 is engaged over the shaft against the flange 71 and a plurality of eccentric discs 73 are keyed to the shaft whereupon a further spacer 74 is engaged thereover and a nut 75 engages a screw threaded portion 76 thus locking the assembly together.

Each disc 73 is eccentrically apertured as at 77 and is provided with a key slot 78 engageable with a key (not illustrated) on the shaft 69. Each adjacent disc has the key slot 78 advanced by 45° so that each disc is eccentrically offset progressively with respect to the one upon each side thereof.

As an illustration, the discs in the present device are 1 inch in thickness and in a distance of 8 inches along the eccentric roller assembly, the offset portion of the discs advances through 360°. This is shown in phantom in FIG. 8.

A source of power taking the form of an electric motor 79 is mounted upon a plate 80 secured to the underside of one of the side plates 45 and a reducer 81 is mounted upon a plate 82 situated above plate 80 as shown in FIG. 5. A drive belt 83 connects the motor to the reducer and a further drive belt 84 connects the reducer 81 to a pulley 85 which is secured to shaft 69 thus supplying rotating power to the eccentric roller assembly 67. The direction of rotation is shown in FIG. 1 by arrow 86.

Situated between the side plates but below and towards the H beams 23 is an idling roller assembly 68 which is cylindrical and is mounted upon a shaft 81' supported within bearings 82' on the side plates 45. Traction studs 83' are welded to the surface of the cylinder and the hide passes over this cylinder after it has passed over the eccentric roller assembly 67, the idling roller assembly being shown in phantom in FIG. 1.

FIG. 12 shows details of the electrical control circuit, it being understood that limit switches are situated along the dressing rail and the hide puller rail 31 as is conventional.

In the present device, 110 volts is the source of power stepped up by means of transformer 87 to 440 volts for operation of the winch motor 58 and the roll assembly motor 79.

The control switch 88 is the "up" button which closes and operates the "up" side of the reversible magnetic solenoid assembly 89. This also opens the "down' interlock 90 to prevent the "down" solenoid coil 91 from pulling in if the "down" button 92 was operated inadvertently.

The roll switch 93 will also close completing the circuit to the roll magnetic solenoid coil 94 thus causing the eccentric roller to turn. The magnetic solenoid is held in by holding contacts 95.

The roll assembly moves upwardly due to the operation of the winches 64 until it strikes an upper rotary limit switch 96 which disconnects the holding contacts 95 and breaks the circuit of the magnetic solenoid 89 thus stopping the carriage from moving upwardly any further.

The down push button 92 operates in a similar manner so that corresponding switches and solenoids have been given similar numbers but with the suffix "A" being used.

FIG. 11 shows an emergency limit switch actuator in the event that the rotary limit switch 96 fails to operate as the roll assembly moves upwardly. It is situated adjacent the upper end 97 of one of the H beam members 23 and consists of a vertically situated rod 98 mounted within guides 99 extending from the upper end 97 and from one of the winch frame members 25. The upper end 100 of the rod 98 is adapted to disconnect the solenoid 88 if it is moved upwardly by being struck by the roll assembly. A spring 101 reacts between the upper guide 99 and a collar 102 on the rod as clearly shown in FIG. 11.

A rail switch 103 (see FIG. 12) is situated adjacent the dressing rail 15 and is adapted to be operated by one of the shackles as it passes thereby and after the hide has been removed. Details of the operation of this switch will be described later on.

FIG. 6 shows details of a rump bar assembly collectively designated 104 and shown in operation in FIG. 1. It consists of a pipe 105 having spaced and parallel side portions 106 and cross portion 107 together with braces 108 therebetween as clearly shown in FIG. 6. The ends of the sides 106 are welded to flanges 109 which in turn are bolted to the H bars 25 adjacent the upper ends 97 thereof and the sides together with the cross bar incline outwardly as shown in FIG. 1 and are braced by braces 110 to the diagonals 27 supporting the winch platform or supporting structure.

This braces the rump away from the hide puller as shown inasmuch as the cross bar 107 engages the rump below the hooks 19.

In operation, the hide puller normally is situated at end 30 of the hide puller rails with the roll assembly 11 in the lowermost position on the H beams 23. As a carcass approaches the station, the hide chain 42 is secured around the neck area of the hide as shown at 44, it being understood that this neck portion which is already detached, is fed over the eccentric roller assembly 67 and over the idling roller assembly 68 as clearly shown in FIG. 1. The winch 39 is operated applying a predetermined amount of tension to the hide and the winch assemblies 64 are operated by means of the "up" push button 88.

The roll assembly therefore moves upwardly with the eccentric roller 67 revolving in the direction of arrow 86 and peeling the hide from the carcass as it moves upwardly. It should be appreciated that the hide is kept away from the carcass after it is stripped by means of the tension and chain 40, thus eliminating contamination of the carcass from the hide.

At the same time the hide puller is moved along the rails 13 and 14 due to the fact that the carcass is being moved along the dressing rail 15 and as it is moved along rails 13 and 14, it elevates very slightly due to the upward slope of these rails. When the roll assembly 11 reaches the upper limit of its travel, it has stripped the hide completely from the carcass and also from the tail and this hide drops downwardly by gravity to a hide chute (not illustrated) situated in the floor adjacent the ends 31 of the hide puller rails. The operator unshackles the chain 40 from the neck 43 and allow the hide to pass to the disposal area.

As soon as the hide leaves the carcass, the hide puller is free to roll back down the rails 13 and 14 to station 30, it being understood that the carriage remains in the upper position at this time.

The stripped carcass moves onwardly on the dressing rail 15 and strikes the aforementioned rail switch 103 which is connected to the winch motor 58 and is thus actuated so that the roll assembly 11 moves downwardly on the H beams 23 to the lower most position ready to be connected to the next carcass moving along the rail 15.

It should be stressed that the eccentric roller assembly 67 rolls the hide away from the carcass and that because of the direction of the portion 42 of the chain 40, this hide drops clear of the carcass as soon as it is finally removed and is held clear during the entire removal process. The tension applied by the hoist 39 maintains the hide in contact with the eccentric roller assembly 67 which engages the line of separation between the hide and the carcass as it moves upwardly.

The design operates in such a way that the hair side of the hide is never exposed to the carcass at any time.

Finally it will be noted in FIG. 1 that vertically extending reinforcing flanges 23' are welded to the opposing flanges 49 between which the roll assembly 11 operates, in order to stiffen the H beams 23 at this point.

Various modification can be made within the scope of the inventive concept which is herein disclosed and/or claimed.

What is claimed to be the present invention is:

1. A hide puller for carcasses on the rail which the carcass has been opened up and the hide has been rimmed back along each side of the cut and in which the carcass is suspended by the hind legs from a dressing rail, comprising in combination a vertically situated carriage, a roll assembly mounted in said carriage for vertical movement up and down said carriage, means to anchor the neck end of the hide to be pulled and to maintain a constant tension thereon, said roll assembly including a hide separating roller engageable between hide and the carcass and adapted to strip the hide from the carcass as said roll assembly moves upwardly in said carriage, a source of power to elevate and lower said roll assembly in said carriage, and a rump bar spanning said carriage adjacent the upper end thereof against which the rump of the carcass engages during the hide pulling operation.

2. The device according to claim 1 which includes an upper carriage rail situated adjacent said dressing rail, and a lower guide rail adjacent the floor, means mounting said carriage for endwise movement along said upper carriage rail and means on said lower guide rail to restrain said carriage from fore and aft movement.

3. The device according to claim 2 which said rail slopes upwardly from one end to the other, the movement of the carcass being stripped pulling said carriage along said rail, said carriage returning to said one end by gravity.

4. The device according to claim 3 in which said roll assembly includes a frame, means mounting said frame in said carriage for said vertical movement up and down said carriage, said frame extending forwardly of said carriage, an eccentric roller component journalled transversely in said frame, a source of power in said frame operatively connected to said roller component for rotating same, and a hide guide roller also journalled transversely to said frame parallel to said roller component but spaced below said roller component.

5. The device according to claim 4 in which said means to raise and lower said roller assembly includes a winch on the upper said of said carriage and cable means extending from said winch to said roll assembly, said source of power on said carriage being operatively connected to said winch, said roll assembly including a pair of spaced and parallel substantially triangular side plates, cross members extending between said side plates, said roller component and said hide guide roller being journalled between said side plates.

6. The device according to claim 4 in which said roller component includes a shaft, a plurality of discs eccentrically mounted in side by side interfacial relationship on said shaft, means to key said discs to said shaft, each of said discs being positioned on said shaft whereby the eccentric lobe of adjacent discs progressively advances around said shaft from one end to the other, and means to clamp said discs onto said shaft.

7. The device according to claim 3 in which said roll assembly includes a frame, means mounting said frame in said carriage for said vertical movement up and down said carriage, said frame extending forwardly of said carriage, an eccentric roller component journalled transversely in said frame, a source of power in said frame operatively connected to said roller component for rotating same, and a hide guide roller also journalled transversely to said frame parallel to said roller component but spaced below said roller components.

8. The device according to claim 7 in which said means to raise and lower said roll assembly includes a winch on the upper side of said carriage and cable means extending from said winch to said roll assembly, said source of power on said carriage being operatively connected to said winch, said roll assembly including a pair of spaced and parallel substantially triangular side plates, cross members extending between said side plates, said roller component and said hide guide roller being journalled between said side plates.

9. The device according to claim 7 in which said roller component includes a shaft, a plurality of discs eccentrically mounted in side by side interfacial relationship on said shaft, means to key said discs to said shaft, each of said discs being positioned on said shaft whereby the eccentric lobe of adjacent discs progressively advances around said shaft from one end to the other, and means to clamp said discs onto said shaft.

10. The device according to claim 2 in which said roll assembly includes a frame, means mounting said frame in said carriage for said vertical movement up and down said carriage, said frame extending forwardly of said carriage, an eccentric roller component journalled transversely in said frame, a source of power in said frame operatively connected to said roller component for rotating same, and a hide guide roller also journalled transversely to said frame parallel to said roller component but spaced below said roller component.

11. The device according to claim 10 in which said means to raise and lower said roller assembly includes a winch on the upper side of said carriage and cable means extending from said winch to said roll assembly, said source of power on said carriage being operatively connected to said winch, said roll assembly including a pair of spaced and parallel substantially triangular side plates, cross members extending between said side plates, said roller component and said hide guide roller being journalled between said side plates.

12. The device according to claim 10 in which said roller component includes a shaft, a plurality of discs eccentrically mounted in side by side interfacial relationship on said shaft, means to key said discs to said shaft, each of said discs being positioned on said shaft whereby the eccentric lobe of adjacent discs progressively advances around said shaft from one end to the other, and means to clamp said discs onto said shaft.

13. The device according to claim 2 in which said roll assembly includes a frame, means mounting said frame in said carriage for said vertical movement up and down said carriage, said frame extending forwardly of said carriage, an eccentric roller component journalled transversely in said frame, a source of power in said frame operatively connected to said roller component for rotating same, and a hide guide roller also journalled transversely to said frame parallel to said roller component but spaced below said roller component.

14. The device according to claim 13 in which said means to raise and lower said roll assembly includes a winch on the upper side of said carriage and cable means extending from said winch to said roll assembly, said source of power on said carriage being operatively connected to said winch, said roll assembly including a pair of spaced and parallel substantially triangular side plates, cross members extending between said side plates, said roller component and said hide guide roller being journaled between said side plates.

15. The device according to claim 13 in which said roller component includes a shaft, a plurality of discs eccentrically mounted in side by side interfacial relationship on said shaft, means to key said discs to said shaft, each of said discs being positioned on said shaft whereby the eccentric lobe of adjacent dics progressively advances around said shaft from one end to the other, and means to clamp said discs onto said shaft.

16. The device according to claim 1 in which said roll assembly includes a frame, means mounting said frame in said carriage for said vertical movement up and down said carriage, said frame extending forwardly of said carriage, an eccentric roller component journalled transversely in said frame, a source of power in said frame operatively connected to said roller component for rotating same, and a hide guide roller also journalled transversely to said frame parallel to said roller component but spaced below said roller component.

17. The device according to claim 16 in which said means to raise and lower said roll assembly includes a winch on the upper side of said carriage and cable means extending from said winch to said roll assembly, said source of power on said carriage being operatively connected to said winch, said roll assembly including a pair of spaced and parallel substantially triangular side plates, cross members extending between said side plates, said roller component and said hide guide roller being journalled between said side plates.

18. The device according to claim 16 in which said roller component includes a shaft, a plurality of discs eccentrically mounted in side by side interfacial relationship on said shaft, means to key said discs to said shaft, each of said discs being positioned on said shaft whereby the eccentric lobe of adjacent discs progressively advances around said shaft from one end to the other, and means to clamp said discs onto said shaft.

19. A hide puller for carcasses on the rail in which the carcass has been opened up and the hide has been rimmed back along each side of the cut and in which the carcass is suspended by the hind legs from a dressing rail, comprising in combination a vertically situated carriage, a roll assembly mounted in said carriage for vertical movement up and down said carriage, means to anchor the neck end of the hide to be pulled and to maintain a constant tension thereon, said roll assembly including a hide separating roller engageable between hide and the carcass and adapted to strip the hide from the carcass as said roll assembly moves upwardly in said carriage, and a source of power to elevate and lower said roll assembly in said carriage, said roll assembly including a frame, means mounting said frame in said carriage for said vertical movement up and down said carriage, said frame extending forwardly of said carriage, an eccentric roller component journalled transversely in said frame, a source of power in said frame operatively connected to said roller component for rotating same, and a hide guide roller also journalled transversely to said frame parallel to said roller component but spaced below said roller component.

20. The device according to claim 19 in which said means to raise and lower said roll assembly includes a winch on the upper side of said carriage and cable means extending from said winch to said roll assembly, said source of power on said carriage being operatively connected to said winch, said roll assembly including a pair of spaced and parallel substantially triangular side plates, cross members extending between said side plates, said roller component and said hide guide roller being journalled between said side plates.

21. The device according to claim 19 in which said roller component includes a shaft, a plurality of discs eccentrically mounted in side by side interfacial relationship on said shaft, means to key said discs to said shaft, each of said discs being positioned on said shaft whereby the eccentric lobe of adjacent discs progressively advances around said shaft from one end to the other, and means to clamp said discs onto said shaft.

References Cited

UNITED STATES PATENTS 3,229,328  1/1966  Schmidt, Jr. _____ 17—21

FOREIGN PATENTS 251,963  5/1964  Australia _____ 17—21
1,055,824  1/1967  Great Britain _____ 17—21

LUCIE H. LAUDENSLAGER, Primary Examiner